United States Patent [19]
Busch et al.

[11] Patent Number: 5,085,824
[45] Date of Patent: Feb. 4, 1992

[54] NUCLEAR REFUELING PLATFORM DRIVE SYSTEM

[75] Inventors: Francis R. Busch, Morgan Hill; David L. Faulstich, San Jose, both of Calif.

[73] Assignee: General Electric Company, San Jose, Calif.

[21] Appl. No.: 648,093

[22] Filed: Jan. 31, 1991

[51] Int. Cl.$^5$ ............................................. G21C 19/00
[52] U.S. Cl. .................................. 376/268; 105/163.2
[58] Field of Search ............... 376/271, 268, 264, 258; 212/205, 218; 105/163.2

[56] References Cited

U.S. PATENT DOCUMENTS

| | | | |
|---|---|---|---|
| 1,181,324 | 5/1916 | Lent | 105/163.2 |
| 2,935,032 | 5/1960 | Tingskog | 105/163.2 |
| 3,703,016 | 11/1972 | Schramm et al. | 105/163.2 |
| 4,427,623 | 1/1984 | Howard et al. | 376/271 |
| 4,576,100 | 3/1986 | Zanin | 376/264 |
| 4,706,570 | 11/1987 | Moro et al. | 105/163.2 |

Primary Examiner—Daniel D. Wasil
Attorney, Agent, or Firm—Robert R. Schroeder

[57] ABSTRACT

A drive system for propelling first and second drive trucks of a bridge includes a first motor and transmission for driving the first truck, an independent second motor and transmission for driving the second truck and a controller for coordinating the first and second motors for maintaining differential transverse travel between the first and second drive trucks to less than a predetermined maximum. A first closed-loop controls velocity of the first drive truck, a second closed-loop controls velocity of the second drive truck, and an auxiliary closed-loop senses a difference in travel of the first and second drive trucks and adjusts performance of at least one of the first and second closed-loops.

14 Claims, 5 Drawing Sheets

NUCLEAR REFUELING PLATFORM DRIVE SYSTEM

TECHNICAL FIELD

The present invention relates generally to a gantry for moving a load in three orthogonal directions, and, more specifically, to a drive system for a nuclear refueling platform or gantry.

BACKGROUND ART

A conventional refueling platform, or gantry, is used for transporting nuclear fuel bundles over a nuclear boiling water reactor, for example. The platform spans the reactor and spent fuel water pool and runs on platform guide rails typically embedded in a concrete floor. The platform is used for removing spent fuel bundles from the reactor core and transporting them underwater to the spent fuel pool, as well as transporting new fuel bundles from a storage area to the reactor core.

The platform typically includes a bridge spanning the water pool which is joined to left and right drive trucks by end frames. The bridge includes a trolley which is selectively positionable along the longitudinal axis of the bridge between the end frames. The trolley includes a main hoist for selectively raising and lowering fuel bundles in the water. The bridge is selectively movable in forward and reverse transverse directions perpendicular to the bridge longitudinal axis along the guide rails.

Accordingly, a fuel bundle may be raised and lowered by the main hoist, and may be translated left and right by the trolley along the longitudinal axis of the bridge, and may also be translated in the transverse direction upon forward and reverse movement of the drive trucks supporting the bridge.

The bridge typically spans a water pool of about 45 feet (13.7 meters) and is sized for translating under water at speeds between 0 and about 50 feet per minute (15.2 meters per minute) fuel bundles weighing about 750 pounds (340 kilograms). In order to effectively translate the fuel bundle under water, the bridge must be made substantially rigid for accommodating the fuel bundle weight, and inertia and drag forces from movement of the fuel bundle under water without undesirable distortion. To accommodate the relatively high weight of the refueling platform, the installed guide rails typically have a rating of about 35 pounds (15.9 kilograms) in the original facility design.

The refueling platform also includes a drive system for translating the bridge in the forward and reverse directions along the guide rails. The drive system typically includes a single electrical motor driving a double output shaft gearbox that drives corresponding chain and sprocket final drive assemblies for driving a bridge driven wheel located in each of the left and right drive trucks.

A second design of conventional refueling platform includes a single motor driving a double output shaft gearbox that drives corresponding right angle gearbox drive assemblies in each of the left and right drive trucks. This design of platform is conventionally sized more rigidly than the above first design platform using chain and sprocket drives, and requires higher rated guide rails, for example rated at about 85 pounds (38.6 kilograms).

In both of the above conventional single motor double output refueling platform designs, skewing, or differential transverse travel of the left and right drive trucks may occur during operation. For example, as the fuel bundle load joined to the main hoist and trolley is positioned off center along the bridge longitudinal axis, a torque is generated on the bridge from the inertia and drag forces of the fuel bundle in the water as the bridge is moved transversely along the guide rails. This skewing torque temporarily slows down travel of one of the two left and right trucks relative to the other. The differential transverse travel between the drive trucks is a function of the inertia and drag of the fuel bundle, its position and trolley position from the center of the bridge, and the velocity and acceleration of the bridge in its transverse motion along the guide rails. Substantially no skewing occurs when the fuel bundle is placed at the center of the bridge, and a maximum amount of skewing occurs when the fuel bundle is placed at either the left or right end of the bridge.

The differential transverse travel between the left and right drive trucks is due in part to the structural flexibility of the bridge. It is also due in part to inherent backlash found in the transmissions joining the motor to the drive trucks. The transmissions which include chain and sprocket reduction drive assemblies, gear reduction drive assemblies, and/or drive shafts typically have backlash, or a hesitation or lag before the motor rotates sufficiently to begin rotation o the driven wheel. The differential transverse travel may also be due to any slippage of a driven wheel on the guide rail which would allow the other driven wheel to advance itself relative thereto.

In operation of the exemplary chain driven fueling platform described above, such skewing has resulted in up to about 2 feet (0.6 meters) of differential transverse travel between the left and right trucks which has occasionally caused the trucks to bind on the guide rails and, therefore, prevent further travel. To release the trucks from their binding condition, heavy duty equipment was required.

Although the second design refueling platform described above is substantially more rigid than the first design, and therefore subject to less differential transverse travel of the drive trucks, it is also more expensive than the first platform and requires more expensive higher rated guide rails.

OBJECTS OF THE INVENTION

Accordingly, one objective of the present invention is to provide a new and improved drive system for a gantry movable by a pair of drive trucks.

Another object of the present invention is to provide a new and improved drive system for a nuclear refueling platform for reducing differential transverse travel between a pair of spaced drive trucks thereof.

Another object of the present invention is to provide a new and improved drive system which may be retrofitted into an existing refueling platform for reducing skewing thereof.

Another object of the present invention is to provide a drive system being effective for automatically compensating for differential transverse movement between a pair of drive trucks of a gantry.

DISCLOSURE OF INVENTION

A drive system for propelling first and second drive trucks of a gantry bridge includes first means for driving the first truck, second means for driving the second truck which is independent of the first driving means, and means for controlling the first and second driving means for maintaining differential transverse travel between the first and second drive trucks to less than a predetermined maximum. The controlling means includes a closed-loop first velocity control means for controlling velocity of the first drive truck, a closed-loop second velocity control means for controlling velocity of the second drive truck, and an auxiliary closed-loop travel control means for sensing a difference in travel of the first and second drive trucks and providing a travel error signal for modifying first and second velocity command signals which control velocity of the first and second drive trucks.

BRIEF DESCRIPTION OF DRAWINGS

The novel features believed characteristic of the invention are set forth and differentiated in the claims. The invention, in accordance with preferred and exemplary embodiments, together with further objects and advantages thereof is more particularly described in the following detailed description taken in conjunction with the accompanying drawing in which:

MODE(S) FOR CARRYING OUT THE INVENTION

Figure 1:
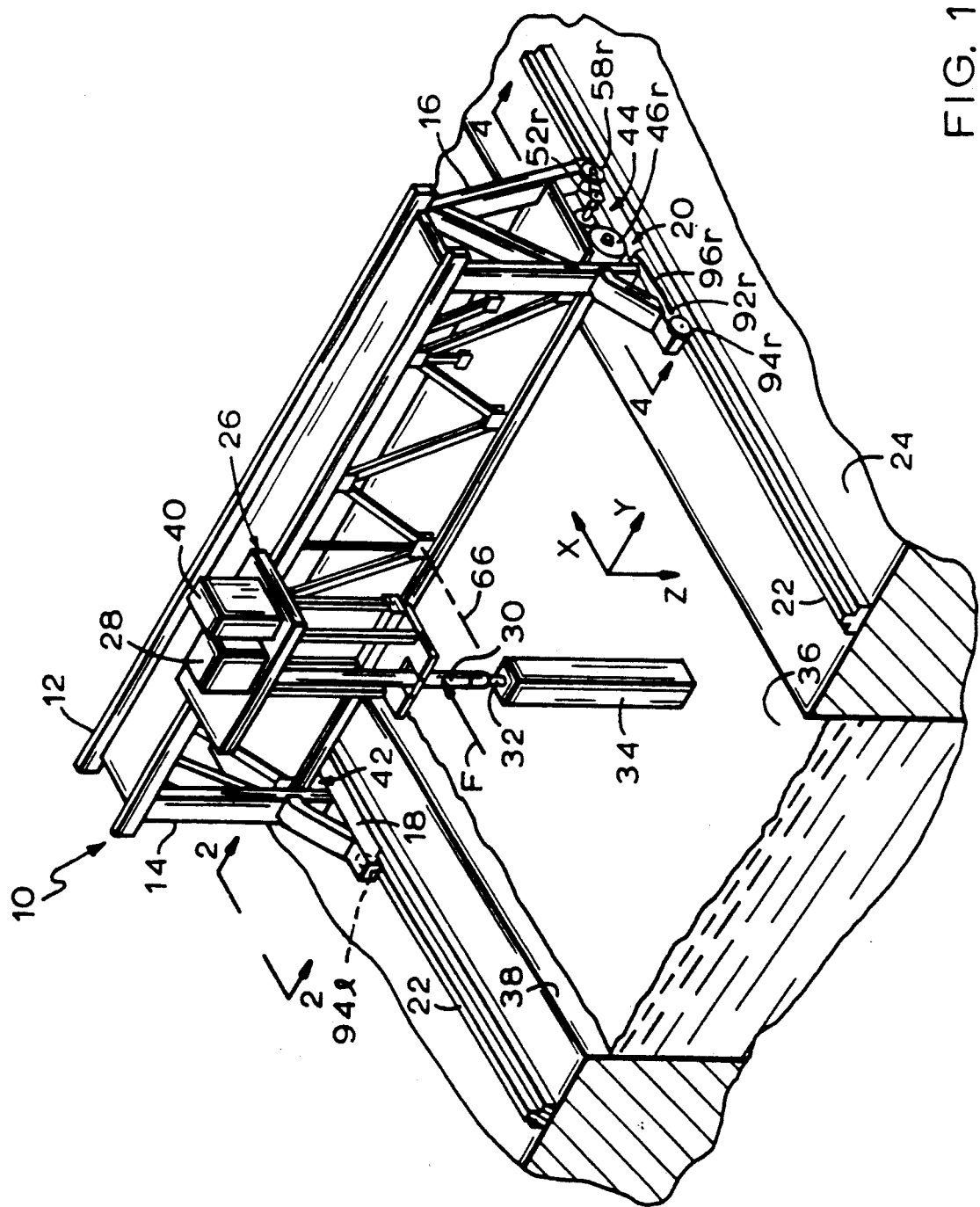
FIG. 1 is a perspective, schematic view of an exemplary nuclear refueling platform in accordance with one embodiment of the present invention.

Illustrated in FIG. 1 is a refueling platform, or gantry, 10 including a conventional bridge 12 having a longitudinal axis Y and a transverse axis X. The bridge 12 is conventionally supported by a first, or left, end frame 14 and a second, or right, end frame 16 spaced longitudinally therefrom. The left end frame 14 is fixedly joined to a first, or left drive truck 18, and the right end frame is fixedly joined to a second, or right drive truck 20. The left and right drive trucks 18 and 20 are conventionally mounted on conventional guide rails 22 fixedly attached to a conventional concrete foundation 24.

The platform 10 further includes a conventional trolley 26 conventionally slidably movable along the bridge longitudinal Y axis in both left and right directions. The platform 10 further includes a conventional main hoist 28 joined to the trolley 26 for longitudinal movement therewith and has a conventional, selectively retractable and extendable mast 30 with a conventional grapple 32 at the end thereof. The grapple 32 is conventionally connectable to a fuel bundle 34 disposed under water 36 contained in a pool 38. The main hoist 28 is conventionally effective for raising and lowering the fuel bundle 34 along a vertical axis Z within the pool 38.

A controller 40 is provided for controlling operation of the left and right drive trucks 18 and 20 and their transverse position X along the guide rails 22, the longitudinal position Y of the trolley 26 along the bridge 12, and the vertical position Z of the mast 30, and therefore the fuel bundle 34.

Figure 2:
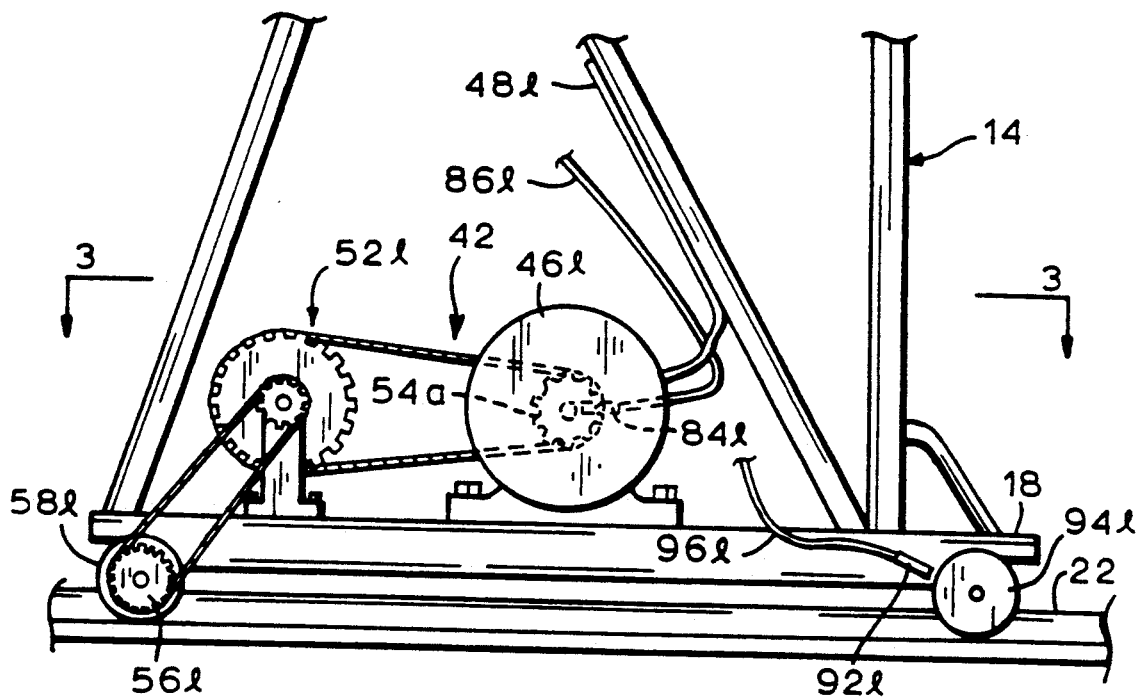
FIG. 2 is a transverse end view of a left drive truck and end frame of the refueling platform illustrated in FIG. 1 taken along line 2—2.
Figure 3:
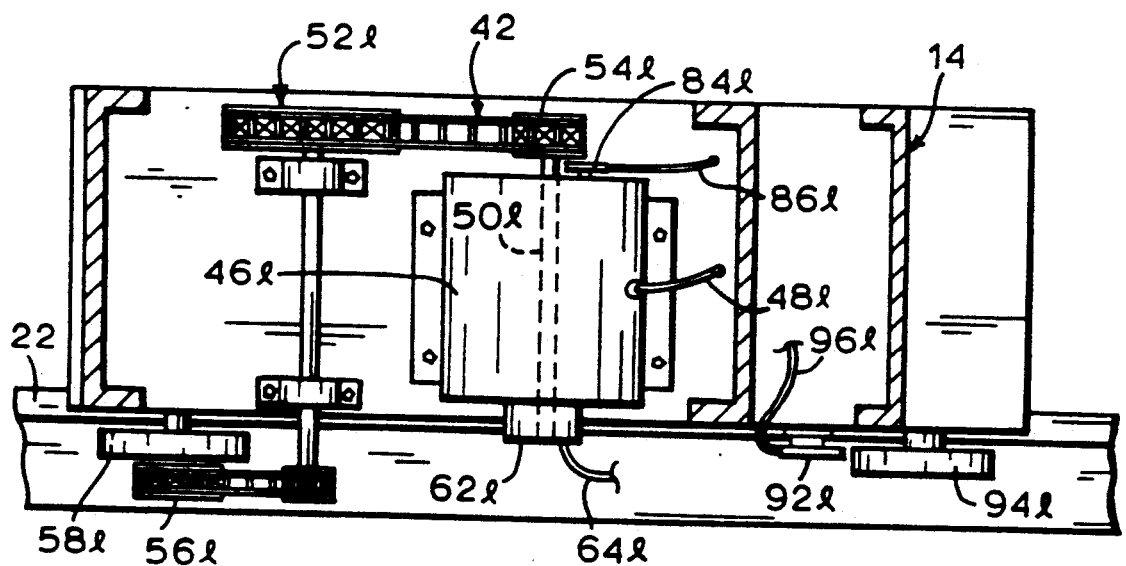
FIG. 3 is a partly sectional transverse view of the left drive truck and end frame illustrated in FIG. 2 taken along line 3—3.

First and second means 42 and 44 are provided for driving the first and second drive trucks 18 and 20, respectively, along the guide rails 22. The first and second driving means 42 and 44 are preferably identical, although in alternate embodiments of the present invention, they may be different. As illustrated in FIGS. 2 and 3, the first driving means 42 includes a conventional electrical motor $46_l$ connected to the controller 40 by a conventional electrical line $48_l$ which controls its operation. The motor $46_l$ includes an output shaft $50_l$ having one end connected to a first speed reducing transmission $52_l$. In this exemplary embodiment of the present invention, the first transmission $52_l$ includes a pair of conventional speed reducing sprockets and chains having an input sprocket $54_l$ joined to the motor output shaft $50_l$, and an output sprocket $56_l$ conventionally fixedly attached to a first, or left driven wheel $58_l$ of the left drive truck 18 for selectively moving the left drive truck 18 along the guide rail 22.

Figure 4:
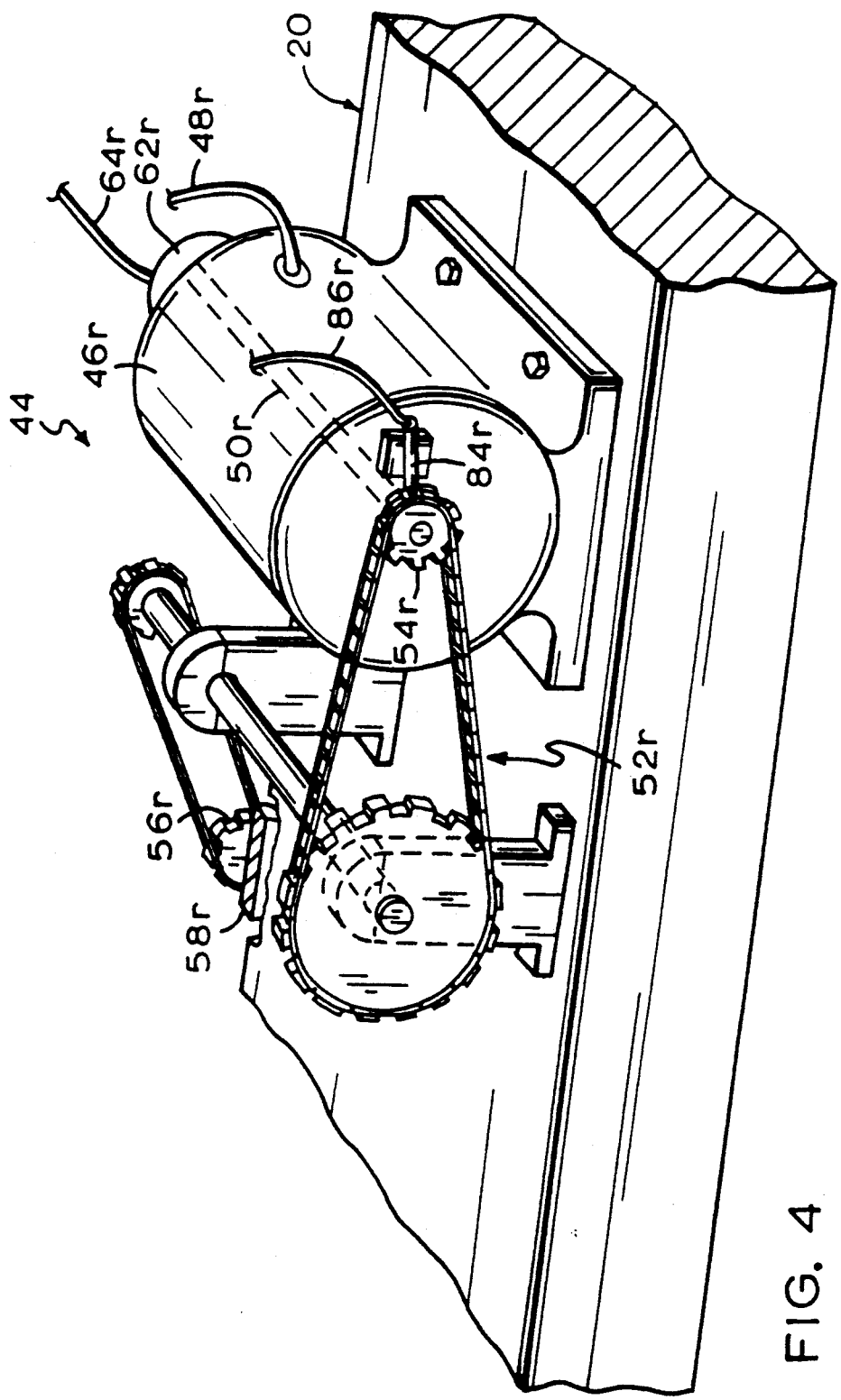
FIG. 4 is a perspective view of a portion of a right drive truck of the refueling platform illustrated in FIG. 1 taken along line 4—4 illustrating a motor and transmission assembly.

As illustrated in FIG. 4, the second driving means 44 includes an identical electrical motor $46_r$, electrical lines $48_r$, output shaft $50_r$, second transmission $52_r$, input sprocket $54_r$, and output sprocket $56_r$. The sprocket $56_r$ is fixedly attached to a second, or right driven wheel $58_r$ of the right drive truck 20 for selectively moving the right drive truck 20 along the guide rail 22.

Referring again to FIGS. 2 and 3, the motor output shaft $50_l$ is also connected at its other end to a conventional electromechanical brake $62_l$ which is conventionally connected to the controller 40 by an electrical line $64_l$ for selectively engaging and releasing the brake $62_l$.

Referring again to FIG. 4, the second driving means 44 similarly includes a conventional electromechanical brake $62_r$ connected to the controller 40 by an electrical line $64_r$ for selectively engaging and releasing the brake $62_r$.

During operation of the bridge 12, the controller 40 separately operates the first and second driving means 42 and 44, which are independent from each other, for moving the left and right drive trucks 18 and 20 either in a forward direction (negative X direction) or in a reverse direction (positive X direction) along the guide rails 22 as shown in FIG. 1. The brakes $62_l$ and $62_r$ are conventionally engaged as required for slowing and stopping movement of the bridge 12 along the guide rails 22.

As illustrated in FIG. 1, the trolley 26 is disposed left of a longitudinal center 66 of the bridge 12 and in this exemplary mode of operation with the bridge 12 being moved in the forward X direction a resultant resistance force F is imposed against the fuel bundle 34 and in turn against the mast 30, trolley 26 and bridge 12. This resistance force F generates a torque on the bridge 12 around the vertical Z axis which will tend to cause the left drive truck 18 to travel less than the right drive truck 20. As described above, due to inherent flexibility of the bridge 12, backlash in the transmissions $52_l$ and $52_r$, and/or slippage of the left and right driven wheels $58_l$ and $58_r$, for example, actual differential transverse travel between the left and right drive trucks 18 and 20 will occur.

Figure 5:
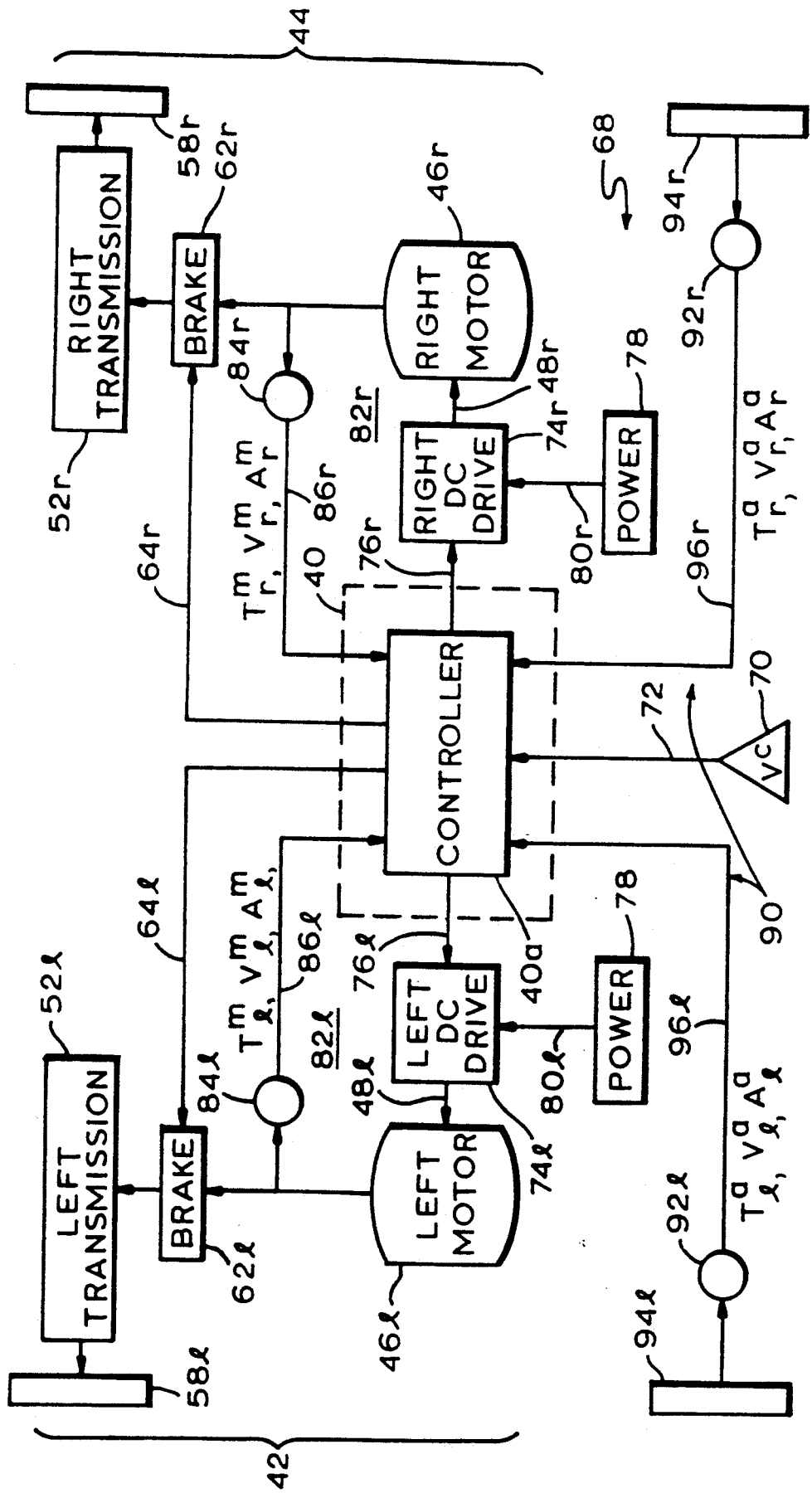
FIG. 5 is a functional block diagram of the drive system illustrated in FIGS. 1-4.

In order to substantially eliminate this differential transverse travel, or maintain this differential transverse travel to less than a predetermined maximum, the present invention further includes means for controlling the first and second driving means 42 and 44 as indicated generally at 68 in FIG. 5. As described above, the left and right driving means 42 and 44 are independent of each other and therefore are independently controlled. Within the platform controller 40, a conventional motion controller 40a is used for independently controlling the left and right motors $46_l$ and $56_r$ while providing coordination therebetween as described below. The motion controller 40a may be an independent dedicated central processing unit (CPU), or may be part of the platform controller 40.

In order to translate the bridge 12 in either its forward or reverse transverse direction along the X axis, the operator actuates a conventional speed and direction throttle 70 which conventionally provides a velocity command signal $V^c$ through a conventional electrical line 72 joined to the motion controller 40a. The controller 40a conventionally provides left and right velocity command signals $V_l^c$ and $V_r^c$, which are nominally or initially equal to the velocity command signal $V^c$, which control operation of the left and right motors $46_l$ and $46_r$. In an exemplary embodiment of the present invention, the left and right velocity command signals $V_l^c$ and $V_r^c$ each have values ranging from $-10$ volts to 0 to $+10$ volts for controlling the motors for variable speed outputs ranging from 0 to $\pm 1,750$ rpm for translating the bridge 12 in forward and reverse directions along the X axis from 0 to about 50 feet per minute (to about 15.2 meters per minute). The left and right velocity command signals $V_l^c$ and $V_r^c$ are low voltage low current signals which are preferably used to control conventional left and right DC power drives $74_l$ and $74_r$, which are connected to the controller 40a by conventional electrical lines $76_l$ and $76_r$. A conventional AC power supply 78 is conventionally connected to the left and right DC drives $74_l$ and $74_r$ by electrical lines $80_l$ and $80_r$. The left and right velocity command signals $V_l^c$ and $V_r^c$ conventionally control the left and right DC drives $74_l$ and $74_r$ which change the AC power from the power supply 78 to DC power of the required polarity and power which is channeled to the motors $46V_l$ and $46_r$ by the lines $48_l$ and $48_r$, respectively.

In practice, providing identical power to the left and right motors $46_l$ and $46_r$ does not necessarily result in equal travel of the left and right drive trucks 18 and 20. This is due to inherent differences in the left and right driving means 42 and 44, and more specifically to the flexibility of the bridge 12 itself, backlash inherent in the transmissions $52_l$ and $52_r$ joining the motors to the driven wheels $58_l$ and $58_r$, and any slippage which may occur between the driven wheels $58_l$ and $58_r$ and the respective guide rails 22.

In accordance with the present invention, the controlling means 68 is effective for maintaining differential transverse travel between the left and right drive trucks 18 and 20 to less than a predetermined maximum, and preferably substantially equal to zero, for obtaining substantially equal travel of the left and right drive trucks 18 and 20 to prevent unacceptable skewing therebetween. In addition to providing the left and right velocity command signals $V_l^c$ and $V_r^c$ to the left and right driving means 42 and 44, the controlling means 68 additionally combines a travel error signal $T^e$ with at least one of the left and right velocity command signals $V_l^c$ and $V_r^c$ for changing or adjusting velocity of a respective one of the left and right drive trucks 18 and 20 for maintaining differential transverse travel between the two drive trucks to less than the predetermined maximum.

Figure 6:
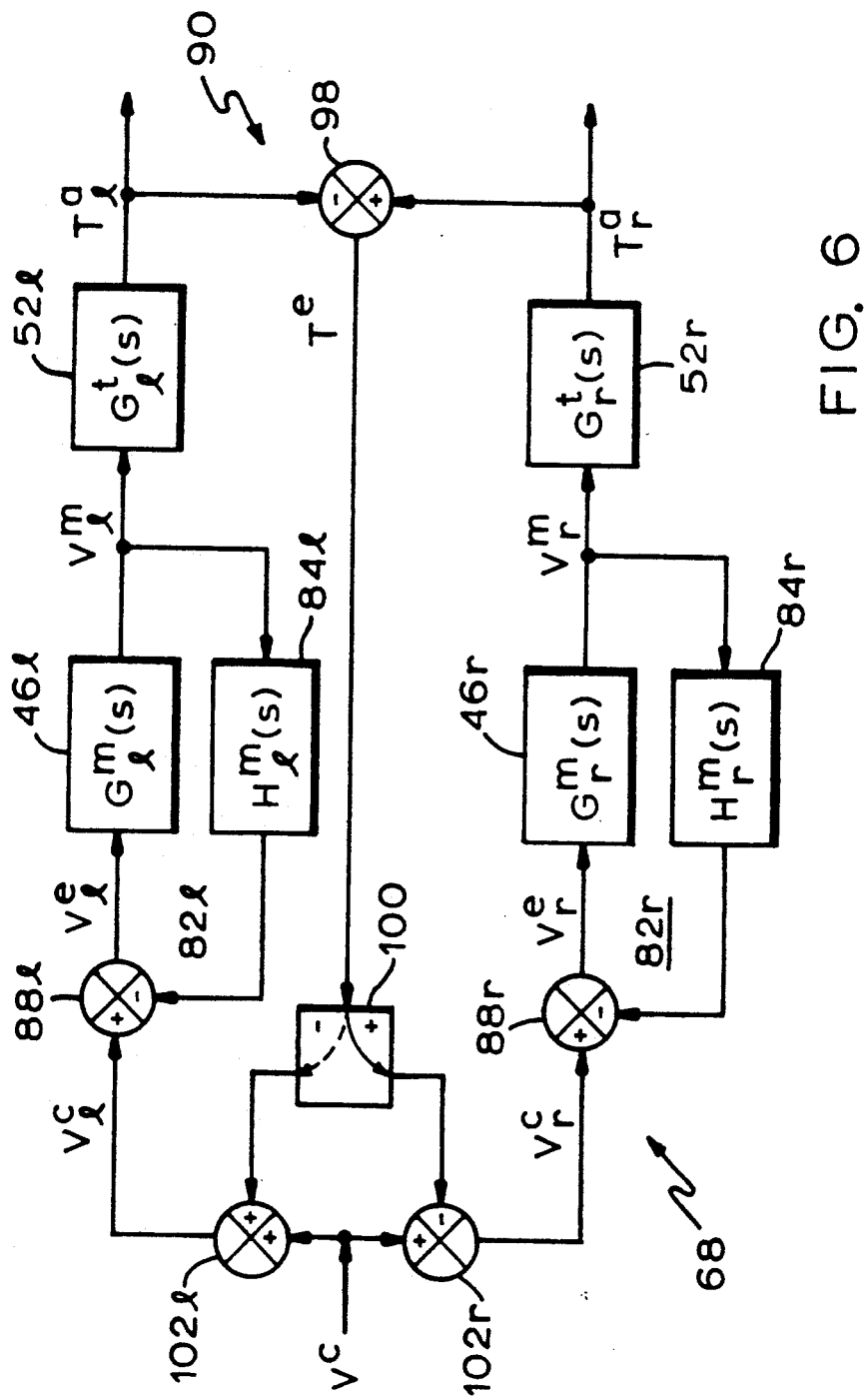
FIG. 6 is a functional block diagram in Laplace transform of the closed-loop control of the drive system illustrated in FIG. 5.

Referring to both FIGS. 5 and 6, the controlling means 68 preferably includes a closed-loop, or feedback first, or left, velocity control means $82_l$ for controlling velocity of the left drive truck 18 by affecting or adjusting the left velocity command signal $V_l^c$ with conventional feedback. Similarly, the controlling means 68 also includes a closed-loop, or feedback, second, or right velocity control means $82_r$ for controlling velocity of the right drive truck 20 by affecting, or adjusting the right velocity command signal $V_r^c$ with conventional feedback.

Conventional first and second, or left and right, motor sensors or encoders $84_l$ and $84_r$ are used for providing first and second, or left and right, feedback signals indicative of measured outputs of the left and right motors $46_l$ and $46_r$, respectively. The motor sensors $84_l$ and $84_r$ conventionally provide measured outputs of rotational position, or travel, velocity, and acceleration of the motor output shafts $50_l$ and $50_r$, i.e. $T_l^m$, $V_l^m$, $A_l^m$ for the left motor $46_l$, and $T_r^m$, $V_r^m$, $A_r^m$ for the right motor $46_r$. The motor sensors $84_l$ and $84_r$, which are additionally shown in FIGS. 2–4, are conventionally connected to the controller 40a by electrical lines $86_l$ and $86_r$, respectively. Since the bridge 12 is being preferably controlled by its velocity, the left velocity control means, or loop, $82_l$ as represented by its generic Laplace transforms in FIG. 6 is shown based on controlling its output velocity $V_l^m$.

Similarly, the right velocity control means $82_r$, or loop, is also represented in FIG. 6 for controlling the right motor output velocity $V_r^m$. The left and right motor velocity signals measured by the sensors $84_l$ and $84_r$, or feedback signals, are conventionally fed back to conventional means $88_l$ and $88_r$ for subtracting the velocity feedback signals from the respective velocity command signals in the motion controller 40a for providing first and second, or left and right velocity error signals $V_l^e$ and $V_r^e$ for controlling the motors $46_l$ and $46_r$.

As illustrated in FIG. 6, the left and right loops $82_l$ and $82_r$ are conventional and effected in the motion controller 40a for conventionally controlling the output velocities of the motors $46_l$ and $46_r$. The motors $46_l$ and $46_r$ are represented schematically by their respective Laplace transforms $G_l^m(S)$ and $G_r^m(S)$ which preferably include their respective left and right DC drives $74_l$ and $74_r$. Similarly, the motor sensors $84_l$ and $84_r$ are represented by their Laplace transforms $H_l^m(S)$ and $H_r^m$.

The left and right loops $82_l$ and $82_r$ are effective for controlling the output of the motors $46_l$ and $46_r$ in response to the respective velocity command signals $V_l^c$ and $V_r^c$. In alternate embodiments of the present invention, the measured left and right motor angular position or travel $T_l^m$, $T_r^m$, and the accelerations $A_l^m$, $A_r^m$ may also be used for more precisely controlling the velocity of the output shafts $50_l$, $50_r$. The output shafts $50_l$, $50_r$ in turn power the left and right transmissions $52_l$ and $52_r$ which in turn rotate the driven wheels $58_l$ and $58_r$.

In accordance with the present invention, the controlling means 68 also includes an auxiliary closed-loop, or feedback, travel control means 90 indicated generally at 90 in FIGS. 5 and 6. The travel control means 90 is provided to automatically adjust the performance of the system represented by the left and right loops $82_l$ and $82_r$ which act independently of each other for controlling travel of the left and right drive trucks 18 and 20. The travel control means 90 is effective for sensing a difference in travel of the left and right drive trucks 18 and 20 and providing the travel error signal $T^e$ which is used for coordinating the operation of the left and right loops $82_l$ and $82_r$ for reducing and preferably substantially eliminating differential transverse travel between the left and right drive trucks 18 and 20 during all modes of operation including those with the trolley 26 being positioned at either left or right of the center 66. Accordingly, any skewing which would otherwise be introduced by the resistance force F may be substantially eliminated.

Actual travel of the drive trucks 18, 20 may be measured by any conventional position sensors located between the respective drive trucks 18, 20 and the guide rails 22. For example, in the preferred embodiment of the present invention, first and second, or left and right travel sensors, or encoders $92_l$ and $92_r$ as illustrated schematically in FIG. 5, are disposed adjacent to left and right undriven wheels $94_l$ and $94_r$ of the left and right drive trucks 18 and 20. The left and right travel sensors $92_l$, $92_r$ are also shown in FIGS. 1-4 and further include conventional electrical lines $96_l$ and $96_r$, respectively, for providing first and second, or left and right feedback travel signals $T_l^a$ and $T_r^a$ indicative of the actual, or measured, transverse positions of the drive trucks 18, 20 along the guide rails 22.

As indicated functionally in FIG. 6, the left and right transmissions $52_l$ and $52_r$ are effective for powering the driven wheels $58_l$ and $58_r$ which in turn move the drive trucks 18 and 20. The actual movement of the drive trucks 18 and 20 is measured by the travel sensors $92_l$ and $92_r$ which provide the actual positions of the drive trucks 18 and 20 as represented by the left and right travel signals $T_l^a$ and $T_r^a$. In the exemplary embodiment illustrated, the travel sensors $92_l$ and $92_r$ measure rotational position of the undriven wheels $94_l$, $94_r$ which is simply mathematically converted to translation of the drive trucks 18 and 20 along the guide rail 22 by multiplying the rotation of the drive wheels times the circumferential length thereof. The travel error signal $T^e$ is simply obtained by a conventional comparator, or subtractor 98 as shown in FIG. 6. In this exemplary embodiment, the position of the left drive truck 18a is subtracted from that of the right drive truck 20 with the travel error signal $T^e$ being equal to the right travel signal $T_r^a$ minus the left travel signal $T_l^a$. Of course, any polarity convention may be used.

The travel error signal $T^e$ is combined with at least one of the left and right velocity command signals $V_l^c$ and $V_r^c$ for changing, or adjusting, the velocity of a respective one of the left and right drive trucks 18, 20 for maintaining any differential transverse travel between the two drive trucks to less than the predetermined maximum, and in the preferred embodiment, substantially equal to zero. A conventional combiner 100, which may simply take the form of conventional software algorithms in the motion controller 40a, predeterminedly combines the travel error signal $T^e$ with the respective velocity command signals.

In a preferred embodiment of the present invention, the combiner 100 is effective for subtracting the travel error signal $T^e$ from the velocity command signal $V_r^c$ or $V_l^c$ for decreasing below the nominal velocity Vhd c the velocity of the respective left or right truck 18, 20 which tends to, or in fact travels more than the other drive truck. For example, if the trolley 26 is positioned to the left of the center 66 as illustrated in FIG. 1, and the bridge 12 is being moved in its forward direction (negative X direction), the right drive truck 20 will, but for the present invention, travel substantially more than the left drive truck 18. Accordingly, the travel error signal $T^e$ will have a positive value and the combiner 100 will automatically provide the travel error signal $T^e$ to only the right loop $82_r$ through a right comparator $102_r$, or in this case a subtractor, which subtracts the travel error signal $T^e$ from the velocity command signal $V^c$ being channeled to the right loop $82_r$. The right velocity command signal $V_r^c$ will then have a value represented by the difference of the velocity command signal $V^c$ and the travel error signal $T^e$ which will then reduce the velocity of the right drive truck 20 to reduce the differential travel with the left drive truck 18.

Similarly, if the trolley 26 were positioned to the right of the center 66 and the bridge 12 were being moved in its forward direction, the left drive truck 18 would tend to travel further relative to the right drive truck 20. In this case, the travel error signal $T^e$ in FIG. 6 would have a negative value since the difference between $T_r^a$ and $T_l^a$ would be negative, and the combiner 100 would then automatically channel the travel error signal solely to a conventional left comparator $102_l$, or in this case an adder, which would add the travel error signal $T^e$ to the velocity command signal $V^c$. Since the travel error signal $T^e$ has a negative value it, in effect, will be subtracted from the velocity command signal $V^c$ thusly reducing the value of the left velocity command signal $V_l^c$ provided to the left loop $82_l$. This in turn will then slow down the left drive truck 18 relative to the right drive truck 20 thus reducing and preferably eliminating skewing therebetween.

Alternatively, the combiner 100 as illustrated in FIG. 6 may be used for adding the travel error signal $T^e$ for increasing the velocity of the respective drive truck 18, 20 which tends to or in fact travels less than the other drive truck. In this case, the path through the combiner 100 would simply be reversed from that shown with positive values of the travel error signal $T^e$ being channeled to the left comparator $102_l$ instead of the right comparator $102_r$. Also in this situation, if the travel error signal had a negative value, the combiner 100 would then simply channel the travel error signal $T^e$ to the right comparator $102_r$ instead of the left comparator $102_l$ for increasing the velocity of the right drive truck 20.

Yet in another embodiment of the present invention, the travel error signal could be both added to the velocity command signal $V^c$ channeled to the left loop $82_l$ for increasing the velocity of the left drive truck 18 in a situation where it tends to travel less than the right drive truck 20, and subtracting the travel error signal $T^e$ from the velocity command signal $V^c$ channeled to the right loop $82_r$ for decreasing the velocity of the right drive truck 20.

In the situation wherein the left and right drive trucks 18 and 20 travel identical distances, the travel error signal $T^e$ will have a zero value, and the left and right velocity command signals $V_l^c$ and $V_r^c$ will be identical. For example, this may occur for an ideal platform 10, or for operation of the platform 10 with the trolley 26 being positioned at the center 66 so that a skewing torque is not imposed on the bridge 12. However, in practical operation of the platform 10, and in particular as the trolley 26 is positioned further and further away to either the left or right of the center 66, the force F acting on the mast 30 will tend to cause the bridge 12 to skew in the transverse 10 direction.

Skewing of the bridge 12 is due in part to the inherent flexibility thereof as well as by inherent backlash between the motors $46_l$, $46_r$ and the driven wheels $58_l$, $58_r$, and additionally by any slippage between the driven wheels $58_l$, $58_r$, and their respective guide rails 22. In order to more accurately control the relative movement between the left and right drive trucks 18 and 20, the travel control means 90 illustrated in FIG. 6 conventionally mathematically models the left and right transmissions $52_l$ and $52_r$ between the motors $46_l$, $46_r$ and the driven wheels $58_l$, $58_r$, which is represented generically by the Laplace transforms $G_l^t(S)$ and $G_r^t(S)$. Furthermore, any slippage between the driven wheels $58_l$, $58_r$ and the guide rails 22 may also be mathematically modeled in the respective Laplace transforms of the left and right transmissions $G_l^t(S)$ and $G_r^t(S)$.

Flexibility of the bridge 12 is generally a linear phenomena, whereas backlash in the transmissions and slippage between the driven wheels and the guide rails are nonlinear conditions. However, the motion controller 40a may be conventionally programmed for mathematically modeling these effects in controlling the operation of the left and right drive trucks 18 and 20. The left and right Laplace transform representations $G_l^t(S)$ and $G_r^t(S)$ are each predetermined correction models which are indicative of at least one of the backlash, transverse flexibility, or slippage conditions described above. In a preferred embodiment of the present invention, these correction models include all three conditions in order to more fully control the operation of the left and right drive trucks 18, 20 for minimizing and preferably eliminating any differential transverse movement between the left and right drive trucks.

In the preferred embodiment of the present invention, the refueling platform 10 is assembled on-site and then the motion controller 40a is systematically operated in all desired modes of operation of the platform 10 for initializing or calibrating all required constants in the correction models particular to each individually built platform 10. For example, the bridge 12 is initially operated in both its forward and reverse directions for determining any backlash, or lag between operation of the respective left and right motors $46_l$, $46_r$ and travel of the left and right drive trucks 18 and 20 as measured by the travel sensors $92_l$, $92_r$. The motion controller 40a conventionally provides required mathematical calculations to quantify the lag characteristics between the left and right drive trucks 18 and 20 due to at least one of the backlash, bridge flexibility, and wheel slippage described above. For example, by operating the bridge in the forward direction, the motion controller 40a will observe a certain amount of lag, or backlash, between initiation of rotation of the motors $46_l$, $46_r$ and movement of the drive trucks 18 and 20 as measured by the travel sensors $92_l$, $92_r$. Accordingly, this backlash characteristic is preferably introduced into the respective left and right mathematical representation i.e. $G_l^t(S)$ and $G_r^t(S)$, for more accurately controlling operation of the left and right drive trucks during normal operation of the platform 10. Similarly, the motion controller 40a may be operated for determining the relative flexibility between the left and right drive trucks, which characteristic may also be introduced into the transforms $G_l^t(S)$ and $G_r^t(S)$. And yet further, any slippage between a driven wheel and its respective guide rail may also be introduced into the transforms if desired.

In the embodiment of the invention illustrated in FIGS. 1–4, the transmissions $52_l$, $52_r$ comprise conventional chain and sprocket reduction drives. These drives inherently include a substantial amount of backlash, and therefore, compensating for such backlash in the respective transmission Laplace transforms will provide a substantial improvement in reducing differential transverse movement between the left and right drive trucks 18 and 20. Since several refueling platforms 10 including such chain and sprocket transmissions presently exist in the field, the present invention will allow a relatively simple retrofit of such refueling platforms for obtaining improved operation thereof and reduced cost.

The present invention may also be applied to other types of refueling platforms including those having conventional gear transmissions as represented schematically by the left and right transmissions $52_l$, $52_r$ in FIGS. 5 and 6.

Referring again to FIGS. 5 and 6, the primary control of the left and right drive trucks 18, 20 is velocity as provided by the velocity command signal $V^c$ and the left and right loops $82_l$ and $82_r$ shown for controlling velocity. However, acceleration and deceleration signals from the motor sensors $84_l$ and $84_r$ as represented by the acceleration signals $A_l^m$ and $A_r^m$ may also be conventionally used, if desired in the travel control means 90. For example, relatively high values of acceleration and deceleration will tend to cause larger differential transverse movement between the left and right drive trucks 18, 20 when subjected to a bridge load unbalance. Accordingly, the motor acceleration signals $A_l^m$ and $A_r^m$ in addition to the measured acceleration signals of the left and right drive trucks 18 and 20 i.e. $A_l^a$ and $A_r^a$ may be conventionally introduced into the travel control means 90, and in particular in the respective Laplace transforms thereof for reducing the differential transverse movement between the left and right drive trucks. As the acceleration of the motors $46_l$, $46_r$ increases, proportionately more correction will be required i.e. larger travel error signal $T^e$, in anticipation of the increased differential transverse movement between the left and right drive trucks to prevent or reduce the occurrence thereof.

Additionally, the measured velocity of the left and right drive trucks i.e. $V_l^a$ and $V_r^a$ as obtained from the travel sensors $92_l$, $92_r$ may also be used in the travel means 90 as required. For example, if the bridge 12 is being operated at a constant speed, the travel control means 90 may be conventionally programmed to recognize this mode of operation and anticipate required corrections provided in the travel error signal $T^e$ in the event of, for example a relatively sudden stop of the bridge and rapid deceleration thereof.

The motion controller 40a preferably includes all the required programs or algorithms for maintaining identical left and right drive truck tracking, or substantially equal travel thereof, during all foreseeable modes of operation of the bridge 12 including acceleration, deceleration, speed control, starting, stopping, in both the forward and reverse directions.

From the teaching herein, the left and right loops $82_l$ and $82_r$ and the travel control means 90 illustrated in FIG. 6 may be conventionally incorporated into appropriate programs or algorithms in the motion controller 40a. For example, the commercially available DMC-700 Industrial Motion Controller available from Galil Motion Control, Incorporated of Palo Alto, Calif., may be used for the motion controller 40a of the present invention.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by letters patent of the United States is the invention as defined and differentiated in the following claims:

We claim:

1. A drive system comprising:
   a gantry including a bridge having longitudinal and transverse axes and supported by spaced first and second end frames joined to first and second drive trucks for moving said bridge along said transverse axis;
   first means for driving said first drive truck;
   second means for driving said second drive truck being independent from said first driving means; and
   means for controlling said first and second driving means for reducing differential transverse travel between said first and second drive trucks, due to a skewing torque acting on said bridge, to less than a predetermined maximum, said controlling means being in the form of an electrical central processing unit and including:
   a closed-loop first velocity control means for controlling velocity of said first drive truck by providing a first command signal to said first driving means;
   a closed loop second velocity control means for controlling velocity of said second drive truck by providing a second command signal to said second driving means; and
   an auxiliary closed-loop travel control means for sensing a difference in travel of said first and second drive trucks and for combining a travel error signal with at least one of said first and second command signals for changing velocity of a respective one of said first and second drive trucks for reducing said differential transverse travel between said first and second drive trucks to less than said predetermined maximum.

2. A drive system according to claim 1 wherein said controlling means is effective for subtracting said travel error signal from said at least one command signal for decreasing velocity of said respective one of said first and second drive trucks which travels more than the other thereof.

3. A drive system according to claim 1 wherein said controlling means is effective for adding said travel error signal to said at least one command signal for increasing velocity of said respective one of said first and second drive trucks which tends to travel less than the other thereof.

4. A drive system according to claim 1 wherein said controlling means is effective for adding said travel error signal to said first command signal for increasing velocity of said first drive truck which tends to travel less than said second drive truck; and subtracting said travel error signal from said second command signal for decreasing velocity of said second drive truck.

5. A drive system according to claim 1 wherein:
   said first and second driving means include first and second motors driving first and second transmissions, respectively, said first and second transmissions driving first and second driven wheels of said first and second drive trucks, respectively;
   said gantry further includes a trolley selectively movable along said bridge longitudinal axis, and a main hoist joined to said trolley;
   said differential transverse travel being effected by at least one of backlash in said first and second transmissions and transverse flexibility of said bridge; and
   said travel control means including a predetermined correction model indicative of said at least one of said backlash and said transverse flexibility.

6. A drive system according to claim 5 wherein said travel control means further includes first and second travel sensors for providing first and second travel signals indicative of transverse positions of said first and second drive trucks, respectively, and said travel error signal is proportional to the difference of said first and second travel signals.

7. A drive system according to claim 6 wherein said first and second travel sensors measure rotational position of first and second undriven wheels of said first and second drive trucks, respectively.

8. A drive system according to claim 6 wherein said first and second transmissions each include reduction chain drives for reducing rotational speed from said first and second motors to said first and second driven wheels, respectively.

9. A drive system according to claim 6 wherein said first and second transmissions each include reduction gear drives for reducing rotational speed from said first and second motors to said first and second driven wheels, respectively.

10. A drive system according to claim 6 wherein said first and second velocity control means each includes first and second motor sensors for providing first and second feedback signals indicative of rotational velocity of said first and second motors, respectively, and means for subtracting said first and second feedback signals from said first and second command signals, respectively, for providing first and second velocity error signals for controlling said first and second motors, respectively.

11. A drive system according to claim 10 wherein said gantry is a nuclear refueling platform and said main hoist is effective for raising and lowering a nuclear fuel bundle.

12. A drive system according to claim 11 wherein said controlling means is effective for subtracting said travel error signal from said at least one command signal for decreasing velocity of said respective one of said first and second drive trucks which travels more than the other thereof.

13. A drive system according to claim 6 wherein said travel control means correction model is indicative of both said backlash and said transverse flexibility.

14. A drive system according to claim 13 further including guide rails upon which said first and second driven wheels are movable, and wherein said travel control means correction model is indicative also of slippage between said first and second driven wheels and said guide rails.

* * * * *